(12) United States Patent
Kusafuka et al.

(10) Patent No.: US 12,313,847 B2
(45) Date of Patent: May 27, 2025

(54) HEAD-UP DISPLAY, HEAD-UP DISPLAY SYSTEM, AND MOVABLE BODY

(71) Applicant: KYOCERA CORPORATION, Kyoto (JP)

(72) Inventors: Kaoru Kusafuka, Tokyo (JP); Mitsuhiro Murata, Yao (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 562 days.

(21) Appl. No.: 17/779,994

(22) PCT Filed: Nov. 17, 2020

(86) PCT No.: PCT/JP2020/042854
§ 371 (c)(1),
(2) Date: May 25, 2022

(87) PCT Pub. No.: WO2021/106688
PCT Pub. Date: Jun. 3, 2021

(65) Prior Publication Data
US 2023/0004002 A1 Jan. 5, 2023

(30) Foreign Application Priority Data
Nov. 27, 2019 (JP) ................. 2019-214706

(51) Int. Cl.
G02B 27/01 (2006.01)
G06F 3/01 (2006.01)
(Continued)

(52) U.S. Cl.
CPC ......... *G02B 27/0101* (2013.01); *G06F 3/013* (2013.01); *B60K 35/00* (2013.01);
(Continued)

(58) Field of Classification Search
CPC .................................................. G02B 27/0101
See application file for complete search history.

(56) References Cited

U.S. PATENT DOCUMENTS 5,005,010 A 4/1991 Misaki et al.
2004/0113866 A1 6/2004 Aoki et al.
(Continued)

FOREIGN PATENT DOCUMENTS

CN 104827967 A 8/2015
JP H6-885 U 1/1994
(Continued)

*Primary Examiner* — Edmond C Lau
(74) *Attorney, Agent, or Firm* — Procopio, Cory, Hargreaves & Savitch LLP

(57) ABSTRACT

A head-up display is mountable on a movable body, and includes a first display panel, a reflective optical element, and an optical member. The first display panel displays a first image. The reflective optical element at least partially reflects image light from the first image displayed by the first display panel toward a user of the movable body. The optical member is between the display panel and the reflective optical element and is light transmissive. The display panel includes a surface facing a surface of the optical member. Each of the surface of the display panel and the surface of the optical member includes a reflection reduction layer to reduce light reflection.

12 Claims, 13 Drawing Sheets

(51) Int. Cl.
 *B60K 35/00* (2006.01)
 *B60K 35/23* (2024.01)
 *B60K 35/28* (2024.01)
 *G09G 3/00* (2006.01)

(52) U.S. Cl.
 CPC .............. *B60K 35/23* (2024.01); *B60K 35/28* (2024.01); *B60K 2360/166* (2024.01); *B60K 2360/167* (2024.01); *B60K 2360/179* (2024.01); *B60K 2360/23* (2024.01); *G09G 3/003* (2013.01); *G09G 2354/00* (2013.01); *G09G 2380/10* (2013.01)

(56) References Cited

U.S. PATENT DOCUMENTS

| | | |
|---|---|---|
| 2014/0253821 A1 | 9/2014 | Takatoh et al. |
| 2015/0226965 A1 | 8/2015 | Kim et al. |
| 2018/0239133 A1 | 8/2018 | Seder et al. |
| 2018/0356631 A1 | 12/2018 | Kuzuhara et al. |
| 2018/0356634 A1 | 12/2018 | Riebe |
| 2019/0049725 A1* | 2/2019 | Kondo ................. G02B 27/283 |
| 2019/0212553 A1 | 7/2019 | Kaneko et al. |
| 2019/0219820 A1* | 7/2019 | Hirakawa .......... G02B 27/0101 |
| 2019/0227387 A1 | 7/2019 | Mizusaki |
| 2019/0255946 A1 | 8/2019 | Takahashi |

FOREIGN PATENT DOCUMENTS

| | | |
|---|---|---|
| JP | H7-172213 A | 7/1995 |
| JP | S63-145726 U | 9/1998 |
| JP | 2013-117586 A | 6/2013 |
| JP | 2015-152732 A | 8/2015 |
| JP | 2018-189901 A | 11/2018 |
| JP | 2019-89480 A | 6/2019 |
| JP | 2019105716 A | 6/2019 |
| JP | 2019128383 A | 8/2019 |
| WO | 2017/094248 A1 | 6/2017 |
| WO | 2018/056111 A1 | 3/2018 |

* cited by examiner

HEAD-UP DISPLAY, HEAD-UP DISPLAY SYSTEM, AND MOVABLE BODY

FIELD

The present disclosure relates to a head-up display, a head-up display system, and a movable body.

BACKGROUND

Known techniques are described in, for example, Patent Literature 1 and Patent Literature 2.

CITATION LIST

Patent Literature

Patent Literature 1: Japanese Unexamined Patent Application Publication No. 7-172213
Patent Literature 2: WO 2017/094248

BRIEF SUMMARY

A head-up display according to an aspect of the present disclosure is a head-up display mountable on a movable body. The head-up display includes a first display panel, a reflective optical element, and an optical member. The first display panel displays a first image. The reflective optical element at least partially reflects image light from the first image displayed by the first display panel toward a user of the movable body. The optical member is between the first display panel and the reflective optical element and is light transmissive. The first display panel includes a surface facing a surface of the optical member. Each of the surface of the first display panel and the surface of the optical member includes a reflection reduction layer that reduces light reflection.

A head-up display system according to another aspect of the present disclosure is a head-up display system mountable on a movable body. The head-up display system includes a first display panel, a reflective optical element, an optical member, a second display panel, and an optical system. The first display panel displays a first image. The reflective optical element at least partially reflects image light from the first image displayed by the first display panel toward a user of the movable body. The optical member is between the first display panel and the reflective optical element and is light transmissive. The second display panel displays a second image. The optical system allows image light from the second image displayed by the second display panel to travel toward the reflective optical element. The optical member is between the optical system and the reflective optical element. The first display panel includes a surface facing a surface of the optical member. Each of the surface of the first display panel and the surface of the optical member includes a reflection reduction layer that reduces light reflection.

A movable body according to another aspect of the present disclosure includes a head-up display. The head-up display includes a first display panel, a reflective optical element, and an optical member. The first display panel displays a first image. The reflective optical element at least partially reflects image light from the first image displayed by the first display panel. The optical member is between the first display panel and the reflective optical element and is light transmissive. The first display panel includes a surface facing a surface of the optical member. Each of the surface of the first display panel and the surface of the optical member includes a reflection reduction layer that reduces light reflection.

BRIEF DESCRIPTION OF DRAWINGS

The objects, features, and advantages of the present disclosure will become more apparent from the following detailed description and the drawings.

DETAILED DESCRIPTION

As a head-up display (HUD) with the structure that forms the basis of a HUD according to one or more embodiments of the present disclosure, a known HUD mountable on a movable body such as a vehicle projects images displayed on a display panel such as a liquid crystal display onto a windshield or another component of the movable body. A HUD may have lower visibility upon receiving external light such as sunlight incident from outside the movable body. Known HUDs may be less susceptible to external light (refer to, for example, Patent Literature 1 and Patent Literature 2). For example, a HUD described in Patent Literature 1 includes, inside a combiner on which an image of a windshield is projected, an anti-reflective layer with the same size as the combiner. A HUD described in Patent Literature 2 includes, at the interior of a vehicle, a convex lens having an anti-reflective coating installed subsequent to a display device.

The movable body may receive external light incident in various directions depending on the situation. The movable body may prevent external light incident in any direction and reflected off any component of the HUD from adversely affecting the field of view of the user.

One or more aspects of the present disclosure are directed to a HUD that is less susceptible to reflected external light that may affect the field of view of a user, and also a movable body on which the HUD is mountable.

Embodiments of the present invention will now be described with reference to the drawings. The drawings used herein are schematic and are not drawn to scale relative to the actual size of each component.

Head-Up Display and Head-Up Display System

Figure 1:
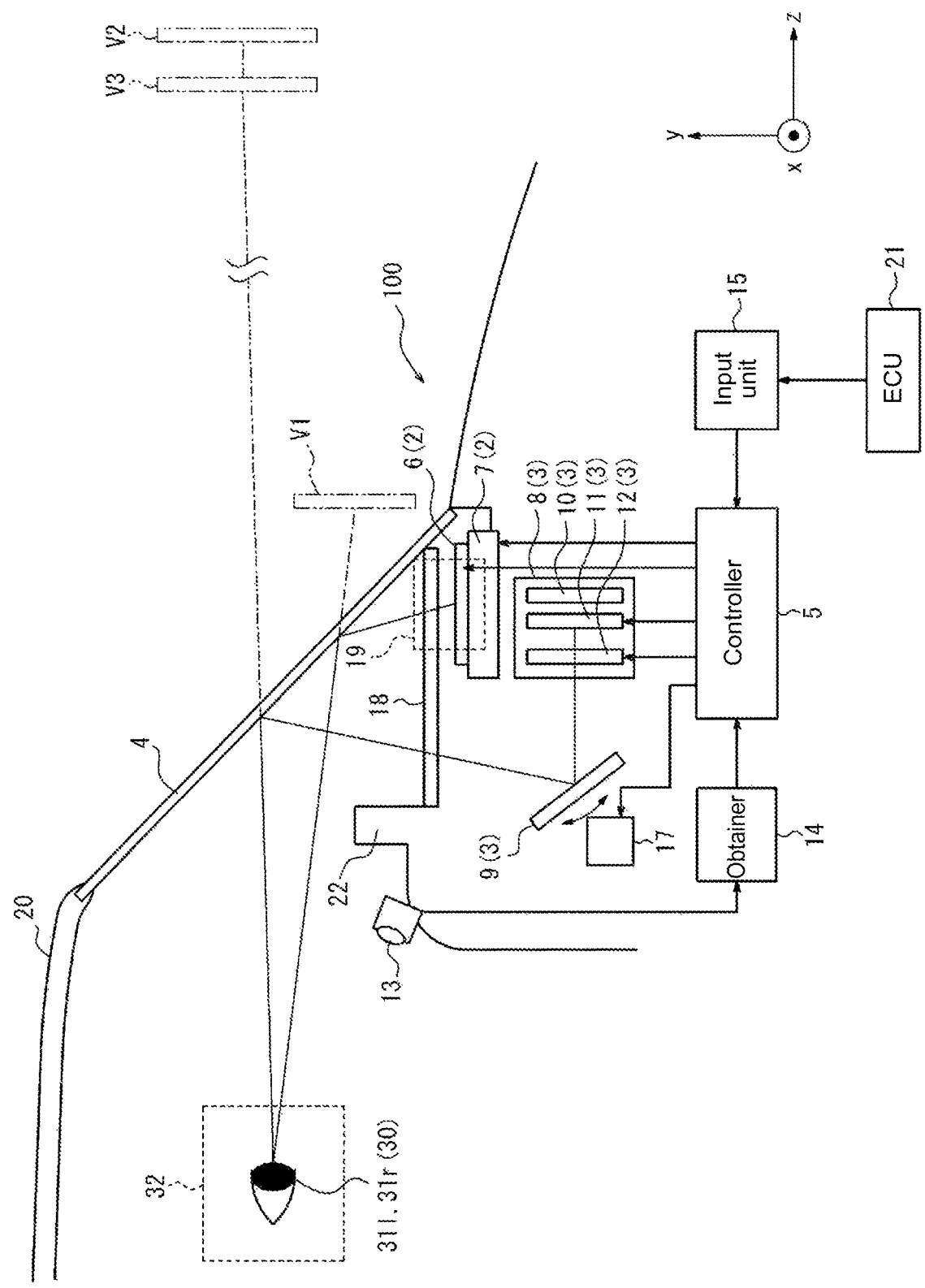
FIG. 1 is a schematic diagram of an example head-up display (HUD) system mounted on a movable body.

As shown in FIG. 1, a head-up display system 100 according to an embodiment of the present disclosure includes a first projection module 2, a second projection module 3, a first reflective optical element 4, and a controller 5. The head-up display system 100 is hereafter also referred to as a HUD system 100. The HUD system 100 may be mounted on a movable body 20. The HUD system 100 mounted on the movable body 20 displays an image for a user 30 aboard the movable body 20. An image projected by the first projection module 2 is referred to as a first image. An image projected by the second projection module 3 is referred to as a second image.

Figure 2:
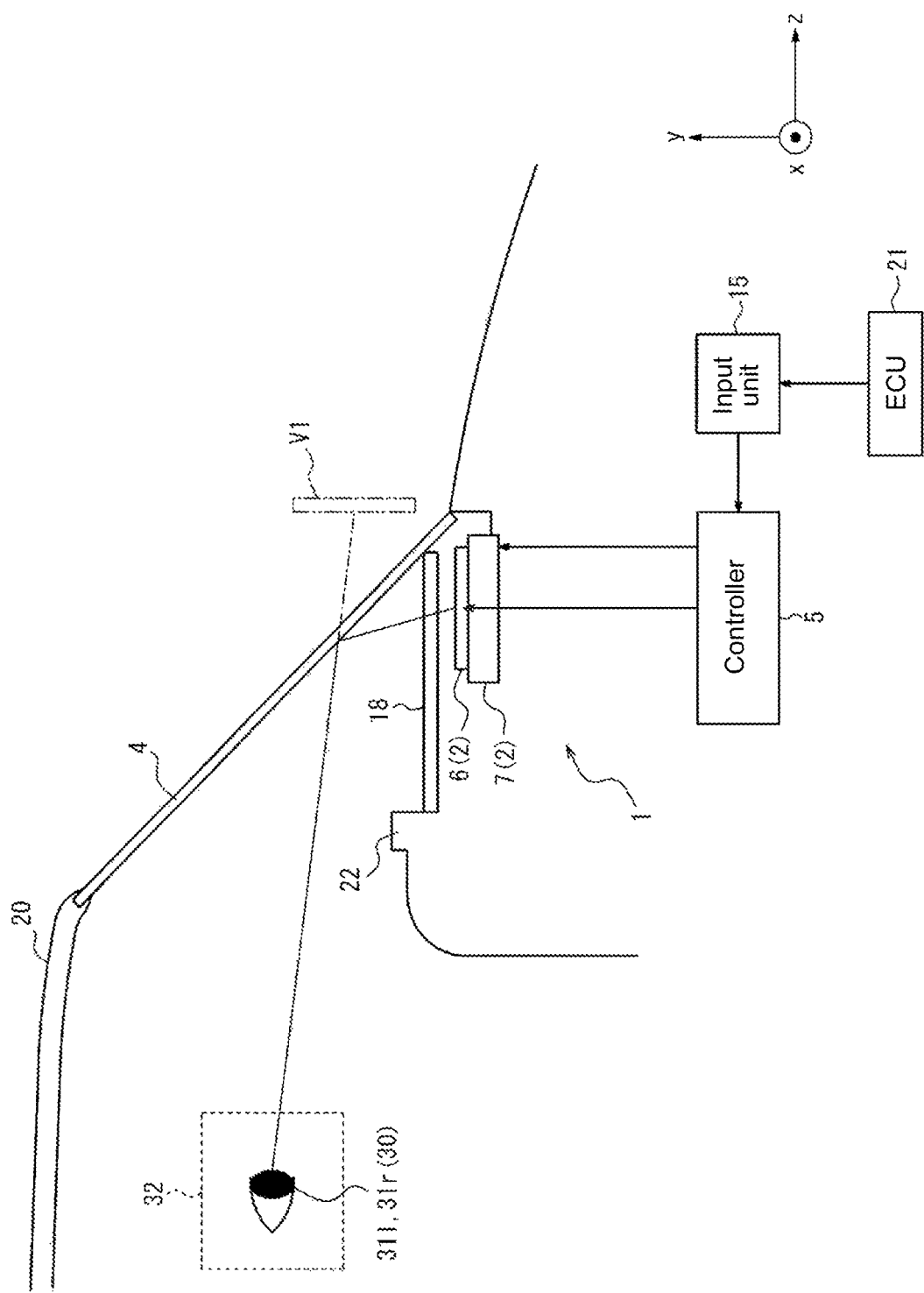
FIG. 2 is a schematic diagram of an example HUD mounted on a movable body.

The HUD system 100 includes two HUDs. A HUD 1 according to one or more embodiments of the present disclosure includes the first projection module 2, the first reflective optical element 4, and the controller 5. The other HUD includes the second projection module 3, the first reflective optical element 4, and the controller 5. Either HUD may stand alone, without the other HUD. The HUD 1 according to one or more embodiments of the present disclosure may have the structure shown in FIG. 2. The HUD 1 in FIG. 2 is included in the HUD system 100 in FIG. 1. The structure of the HUD system 100 shown in FIG. 1 will now be described.

FIG. 1 shows the HUD system 100 mounted on the movable body 20. In FIG. 1, x-direction refers to an interocular direction of the user 30, or the direction along a line passing through a left eye 31l and a right eye 31r of the user 30, z-direction refers to the front-rear direction as viewed from the user 30, and y-direction refers to the height direction orthogonal to x-direction and z-direction.

The movable body according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above examples. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

First Projection Module

The first projection module 2 includes a first display panel 6. The first display panel 6 displays an image. The first display panel 6 may include a flat display panel selected from a liquid crystal display (LCD), an organic electroluminescent (EL) display, an inorganic EL display, a plasma display panel (PDP), a field-emission display (FED), an electrophoresis display, and a twisting-ball display.

In one of multiple embodiments, the first display panel 6 emits image light directly toward the first reflective optical element 4 as shown in FIG. 1. The image light reflected by the first reflective optical element 4 reaches the left eye 31l and the right eye 31r of the user 30. This causes the user 30 to view a first virtual image V1 of the first display panel 6 reflected by the first reflective optical element 4.

The first projection module 2 may further include a stage 7 on which the first display panel 6 is mountable. The stage 7 can move or orient the first display panel 6 with respect to the first reflective optical element 4. This causes the first projection module 2 to change the position at which the first image is projected on the first reflective optical element 4.

Second Projection Module

The second projection module 3 includes a display device 8 and an optical system 9.

The display device 8 includes an illuminator 10 and a second display panel 11. The display device 8 emits image light from the second image displayed on the second display panel 11. For the second projection module 3 that can project a parallax image viewable as a three-dimensional (3D) image to the user 30, the display device 8 may further include a parallax optical element 12. For the second projection module 3 that projects an image viewable as a two-dimensional (2D) image alone to the user 30, the parallax optical element 12 may be eliminated. The structure including the second projection module 3 that can display a parallax image will be described in detail later.

The optical system 9 causes image light from the second image emitted by the display device 8 to travel toward the first reflective optical element 4. The optical system 9 may have a predetermined positive refractive index. The optical system 9 with a predetermined positive refractive index causes the second image on the second display panel 11 to be projected as an enlarged virtual image at a position farther than the first reflective optical element 4 in the field of view of the user 30. The optical system 9 may include a mirror. The mirror included in the optical system 9 may be a concave mirror.

The structure of the second projection module 3 that can display a parallax image will now be described.

The illuminator 10 illuminates the second display panel 11 with planar illumination light. The illuminator 10 may include a light source, a light guide plate, a diffuser plate, and a diffuser sheet. The illuminator 10 spreads illumination light emitted from its light source uniformly to illuminate the surface of the second display panel 11. The illuminator 10 can emit illumination light to be substantially uniform through, for example, the light guide plate, the diffuser plate, and the diffuser sheet. The illuminator 10 may emit the uniform light toward the second display panel 11.

The second display panel 11 may be, for example, a transmissive liquid crystal display panel. The second display panel 11 is not limited to a transmissive liquid crystal panel but may be a self-luminous display panel. The self-luminous display panel may be, for example, an organic EL display or an inorganic EL display. For the second display panel 11 being a self-luminous display panel, the display device 8 may not include the illuminator 10.

Figure 3:
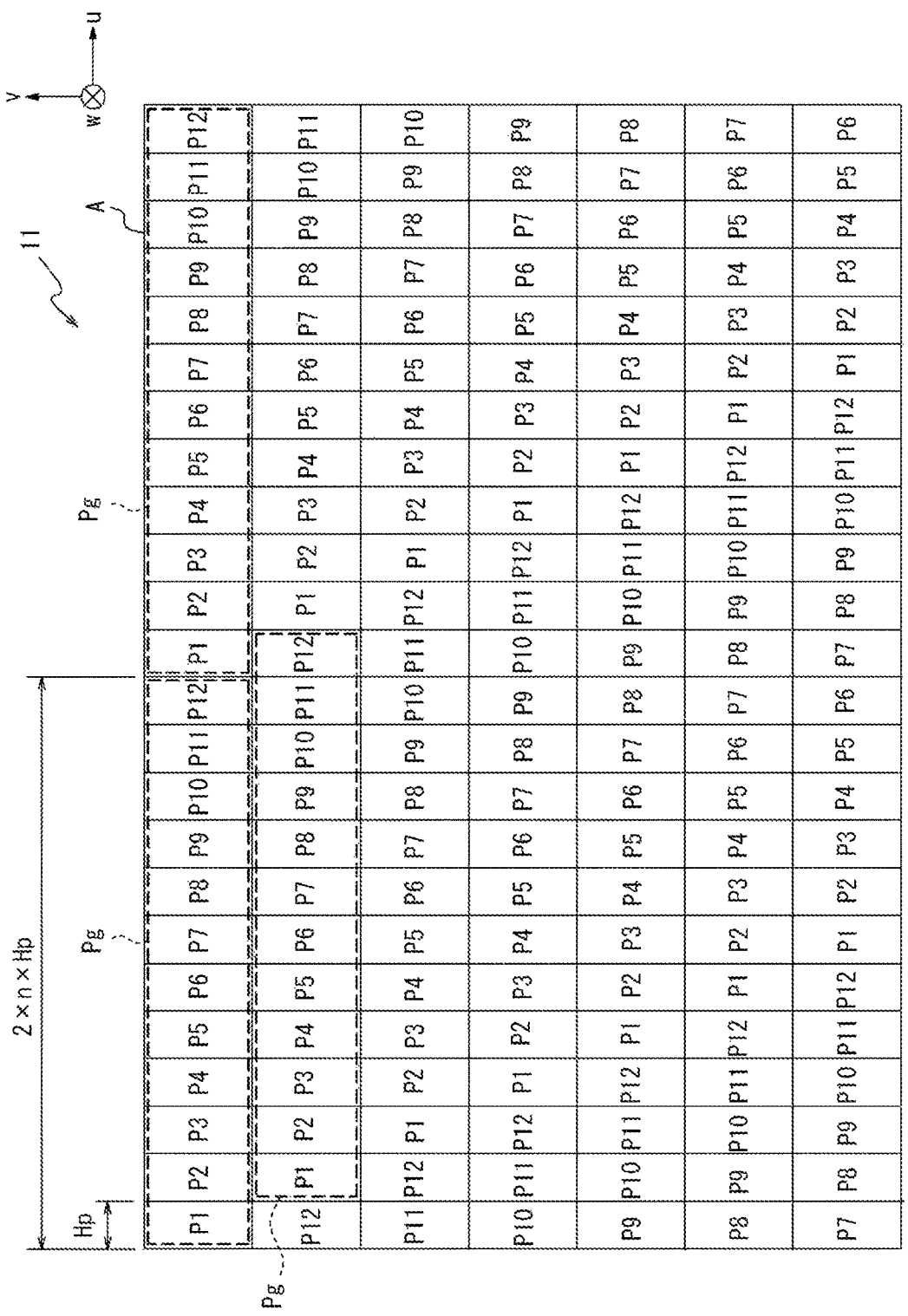
FIG. 3 is a diagram of an example second display panel shown in FIG. 1 viewed in a depth direction.

As shown in FIG. 3, the second display panel 11 includes a planar active area A including multiple divisional areas. The active area A can display a parallax image. The parallax image includes a left eye image and a right eye image (described later). The right eye image has parallax with respect to the left eye image. In FIG. 3, the divisional areas are defined in u-direction and in v-direction orthogonal to u-direction. The direction orthogonal to u-direction and v-direction is referred to as w-direction. The u-direction may be referred to as a horizontal direction. The v-direction may be referred to as a vertical direction. The w-direction may be referred to as a depth direction. The u-direction is the direction corresponding to the parallax direction of the user 30.

Each divisional area corresponds to a subpixel. Thus, the active area A includes multiple subpixels arranged in a lattice in u-direction and v-direction. Each subpixel has one of the colors red (R), green (G), and blue (B). One pixel may be a set of three subpixels with R, G, and B. One pixel may include four or any other number of subpixels, instead of three subpixels. One pixel may include subpixels with a combination of colors different from R, G, and B. A pixel may be referred to as a picture element. For example, multiple subpixels included in one pixel may be arranged in the horizontal direction. Multiple subpixels having the same color may be arranged, for example, in the vertical direction.

The multiple subpixels arranged in the active area A form subpixel groups Pg under control by the controller 5. Multiple subpixel groups Pg are arranged repeatedly in u-direction. Each subpixel group Pg may be aligned with or shifted from the corresponding subpixel group Pg in v-direction. For example, the subpixel groups Pg are repeatedly arranged in v-direction at positions shifted by one subpixel in u-direction from the corresponding subpixel group Pg in adjacent rows. The subpixel groups Pg each include multiple subpixels in predetermined rows and columns. More specifically, the multiple subpixel groups Pg each include (2×n×b) subpixels P1 to PN (N=2×n×b), which are consecutively arranged in b rows in v-direction and in (2×n) columns in u-direction. In the example shown in FIG. 3, n is 6, and b is 1. The active area A shown in FIG. 3 includes the subpixel groups Pg each including 12 subpixels P1 to P12 consecutively arranged in one row in v-direction and in 12 columns in u-direction. In the example shown in FIG. 3, some of the subpixel groups Pg are denoted by reference signs.

Each subpixel group Pg is the smallest unit controllable by the controller 5 to display an image. The subpixels included in each subpixel group Pg are identified using identification reference signs P1 to PN (N=2×n×b). The subpixels P1 to PN (N=2×n×b) included in each subpixel group Pg with the same identification reference signs are controlled by the controller 5 at the same time. Being controlled at the same time includes being controlled simultaneously and substantially simultaneously. Being controlled at the same time includes being controlled based on the same single clock and in the same frame. For example, the controller 5 can switch the image to be displayed by the subpixels P1 from the left eye image to the right eye image at the same time in all the subpixel groups Pg.

As shown in FIG. 1, the parallax optical element 12 extends along the second display panel 11. The parallax optical element 12 is separate from the active area A in the second display panel 11 by a gap g, or a distance. The parallax optical element 12 may be located opposite to the illuminator 10 from the second display panel 11. The parallax optical element 12 may be located between the second display panel 11 and the illuminator 10.

Figure 4:
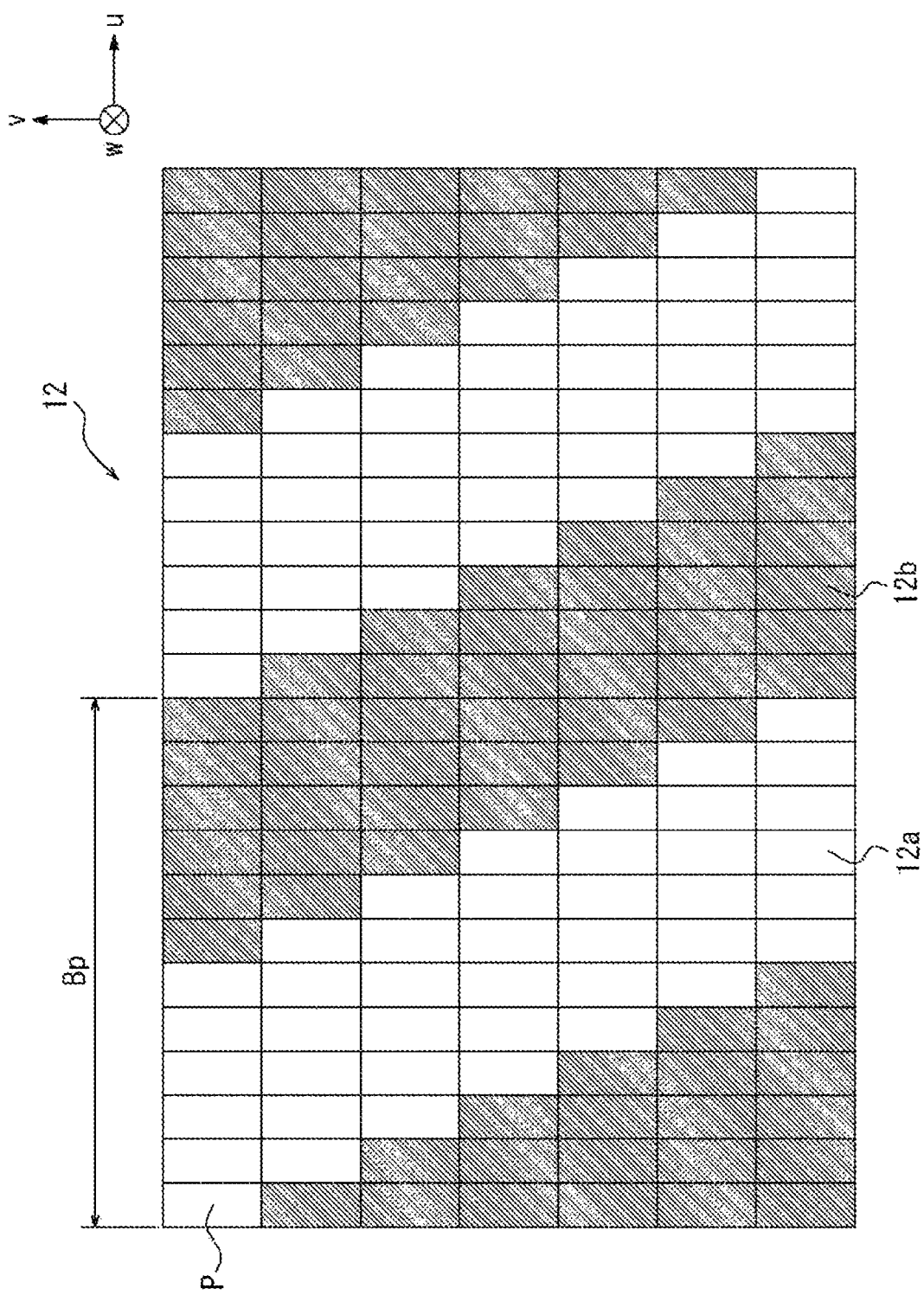
FIG. 4 is a diagram of an example parallax optical element shown in FIG. 1 viewed in the depth direction.

The parallax optical element 12 can define the traveling direction of image light emitted from the multiple subpixels. The parallax optical element 12 can substantially define a viewing zone 32 for a parallax image. The viewing zone 32 is the range of space from which the left eye 31*l* and the right eye 31*r* of the user 30 can view the parallax image as a 3D image. In one example, the parallax optical element 12 is a liquid crystal shutter as shown in FIG. 4. Similarly to the second display panel 11, the liquid crystal shutter includes multiple pixels P. The parallax optical element 12 being a liquid crystal shutter can control the light transmittance of each pixel P. Each pixel P in the parallax optical element 12 can switch between a high light-transmittance state and a low light-transmittance state. A pixel P with a higher light transmittance may be hereafter referred to as an open pixel. The multiple pixels P included in the parallax optical element 12 may correspond to the multiple subpixels included in the second display panel 11. The multiple pixels P in the parallax optical element 12 differ from the subpixels in the second display panel 11 in that the pixels P have no color components.

The parallax optical element 12 includes multiple transmissive portions 12*a* and multiple light-reducing portions 12*b* as controlled by the controller 5. For the parallax optical element 12 being a liquid crystal shutter, the transmissive portions 12*a* include pixels P with a higher light transmittance, and the light-reducing portions 12*b* include pixels P with a lower light transmittance. The light-reducing portions 12*b* are strip areas extending in a predetermined direction in the plane of the parallax optical element 12. The light-reducing portions 12*b* define transmissive portions 12*a* between adjacent light-reducing portions 12*b*. The transmissive portions 12*a* and the light-reducing portions 12*b* extend in a predetermined direction along the active area A. The transmissive portions 12*a* and the light-reducing portions 12*b* are arranged alternately in a direction orthogonal to the predetermined direction. The transmissive portions 12*a* have a higher light transmittance than the light-reducing portions 12*b*. The transmissive portions 12*a* may have a light transmittance 10 or more times, or 100 or more times, or 1000 or more times the light transmittance of the light-reducing portions 12*b*. The light-reducing portions 12*b* have a lower light transmittance than the transmissive portions 12*a*. The light-reducing portions 12*b* may block image light.

The direction in which the transmissive portions 12*a* and the light-reducing portions 12*b* extend may correspond to the direction in which the subpixel groups Pg in the second display panel 11 are arranged. The parallax optical element 12 is controlled to simultaneously cause subpixels in the subpixel groups Pg identified with the same identification reference signs P1 to P12 to be light-transmissive or light-reducing as viewed with the left eye 31*l* and the right eye 31*r* of the user 30.

Figure 5:
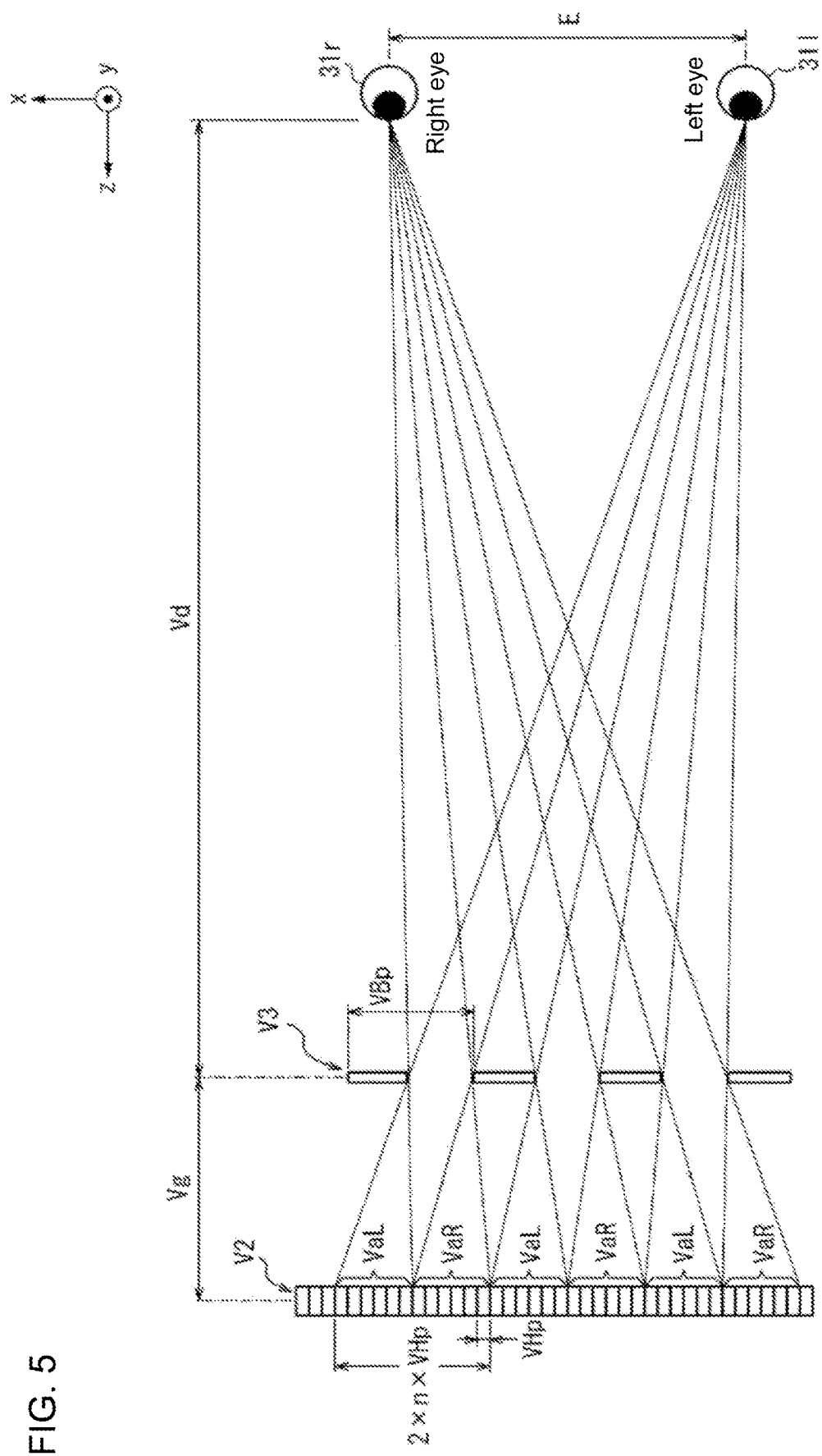
FIG. 5 is a diagram describing the relationship between a virtual image and a user's eyes shown in FIG. 1.

Image light from the second image emitted from the active area A on the second display panel 11 partially transmits through the transmissive portions 12*a* and reaches the first reflective optical element 4 through the optical system 9. The image light reaching the first reflective optical element 4 is reflected by the first reflective optical element 4 and reaches the left eye 31*l* and the right eye 31*r* of the user 30. This allows the left eye 31*l* and the right eye 31*r* of the user 30 to view, as a virtual image of an image appearing on the active area A, a second virtual image V2 frontward from the first reflective optical element 4. Being frontward herein refers to z-direction. As shown in FIG. 5, the user 30 perceives an image including a third virtual image V3 that is a virtual image of the parallax optical element 12 appearing to define the direction of image light from the second virtual image V2.

The user 30 thus views the image appearing as the second virtual image V2 through the third virtual image V3. In reality, the user 30 does not view the third virtual image V3, or a virtual image of the parallax optical element 12. However, the third virtual image V3 is hereafter referred to as appearing at the position at which the virtual image of the parallax optical element 12 is formed and as defining the traveling direction of image light from the second virtual image V2. Areas in the second virtual image V2 viewable by the user 30 with image light reaching the position of the left eye 31*l* of the user 30 are hereafter referred to as left viewable areas VaL. Areas in the second virtual image V2 viewable by the user 30 with image light reaching the position of the right eye 31*r* of the user 30 are referred to as right viewable areas VaR.

As shown in FIG. 5, a virtual image barrier pitch VBp and a virtual image gap Vg are determined to satisfy Formula 1 and Formula 2 below using an optimum viewing distance Vd.

$$E:Vd=(n \times VHp):Vg \quad (1)$$

$$Vd:VBp=(Vdv+Vg):(2 \times n \times VHp) \quad (2)$$

The virtual image barrier pitch VBp is the interval in x-direction at which the light-reducing portions 12*b* projected as the third virtual image V3 are arranged in a direction corresponding to u-direction. The virtual image gap Vg is the distance between the third virtual image V3 and the second virtual image V2. The optimum viewing distance Vd is the distance between the position of the left eye 31*l* or the right eye 31*r* of the user 30 and the third virtual image V3, or a virtual image of the parallax optical element 12. An interocular distance E is the distance between the left eye 31*l* and the right eye 31*r*. The interocular distance E may be, for example, 61.1 to 64.4 mm, as calculated through studies conducted by the National Institute of Advanced Industrial Science and Technology. VHp is the horizontal length of each subpixel of the virtual image. VHp is the length of each subpixel of the second virtual image V2 in a direction corresponding to x-direction.

As described above, the left viewable areas VaL in FIG. 5 are defined on the second virtual image V2 and viewable by the left eye 31*l* of the user 30 when image light transmitted through the transmissive portions 12*a* of the parallax optical element 12 reaches the left eye 31*l* of the user 30. As described above, the right viewable areas VaR are defined on the second virtual image V2 and viewable by the right eye 31*r* of the user 30 when image light transmitted through the transmissive portions 12*a* of the parallax optical element 12 reaches the right eye 31*r* of the user 30.

Figure 6:
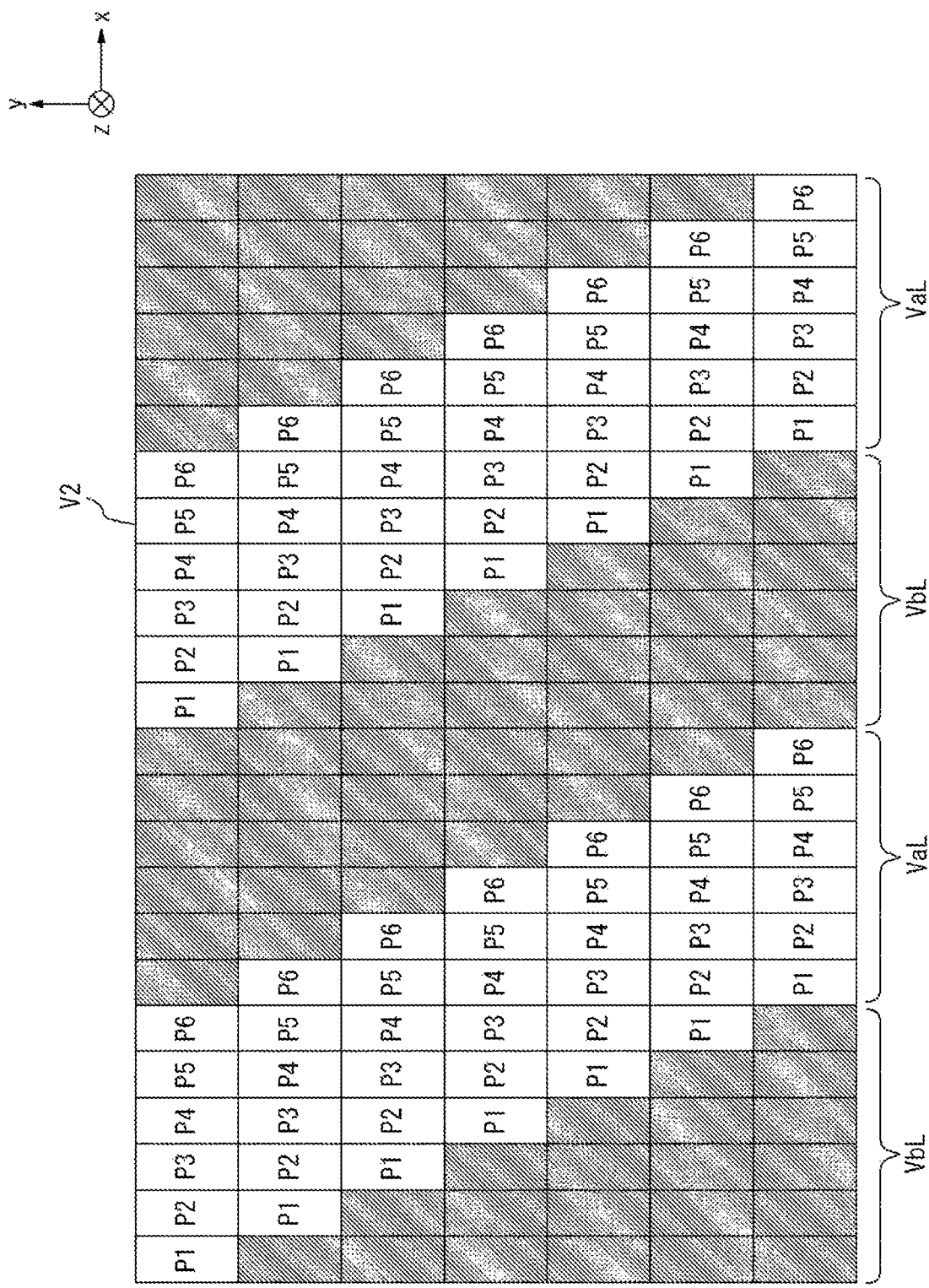
FIG. 6 is a diagram showing an area viewable with a left eye in the virtual image for the second display panel.

FIG. 6 shows an example array of subpixels of the second virtual image V2 as viewed with the left eye 31*l* of the user 30 using the parallax optical element 12 with an aperture ratio of 50%. The subpixels on the second virtual image V2 are denoted by the same identification reference signs P1 to P12 as the subpixels shown in FIG. 3. The parallax optical element 12 with an aperture ratio of 50% includes the transmissive portions 12*a* and the light-reducing portions 12*b* each having the same width in the interocular direction (x-direction). The second virtual image V2 includes left light-reducing areas VbL with light reduced by the third virtual image V3. The left light-reducing areas VbL are less easily viewable with the left eye 31*l* of the user 30 when the image light is reduced by the light-reducing portions 12*b* on the parallax optical element 12.

Figure 7:
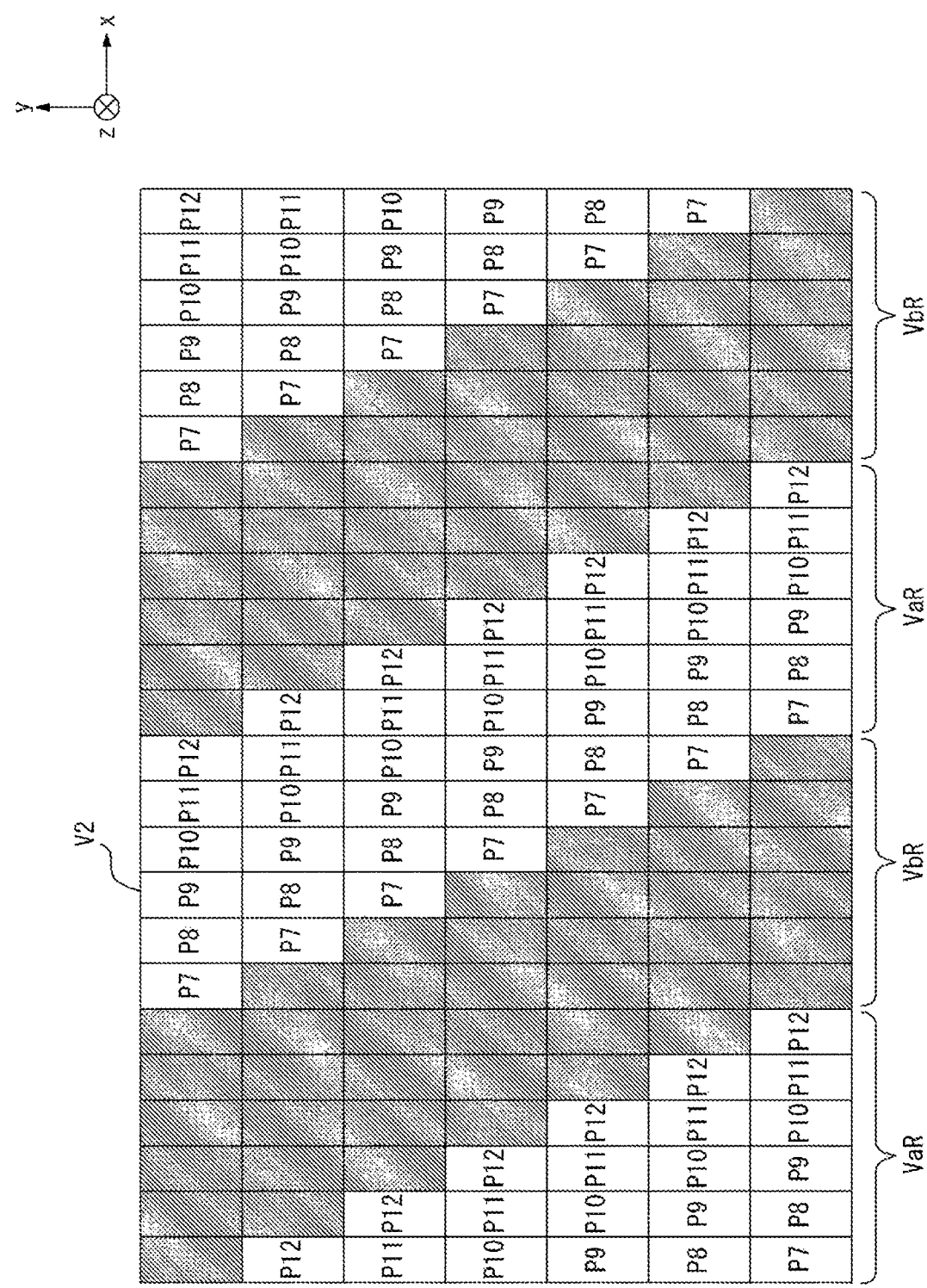
FIG. 7 is a diagram showing an area viewable with a right eye in the virtual image for the second display panel.

FIG. 7 shows an example array of subpixels of the second virtual image V2 viewed with the right eye 31*r* of the user 30 when the left viewable areas VaL and the left light-reducing areas VbL located as shown in FIG. 6 are viewed with the left eye 31*l* of the user 30. The second virtual image V2 includes right light-reducing areas VbR with light reduced by the third virtual image V3. The right light-reducing areas VbR are less easily viewable with the right eye 31*r* of the user 30 when the image light is reduced by the light-reducing portions 12*b* on the parallax optical element 12.

With the parallax optical element 12 having an aperture ratio of 50%, the left viewable areas VaL may match the right light-reducing areas VbR, and the right viewable areas VaR may match the left light-reducing areas VbL. With the parallax optical element 12 having an aperture ratio of less than 50%, the left viewable areas VaL may be included in the right light-reducing areas VbR, and the right viewable areas VaR may be included in the left light-reducing areas VbL. Thus, the right viewable areas VaR are not easily viewable with the left eye 31*l*, and the left viewable areas VaL are not easily viewable with the right eye 31*r*.

In the example shown in FIGS. 6 and 7, each left viewable area VaL includes the virtual image of each of the subpixels P1 to P6 arranged in the active area A. The virtual image of the subpixels P7 to P12 arranged in the active area A is less easily viewable with the left eye 31*l* of the user 30. Each right viewable area VaR includes the virtual image of each of the subpixels P7 to P12 arranged in the active area A. The virtual image of the subpixels P1 to P6 arranged in the active area A is less easily viewable with the right eye 31*r* of the user 30. The controller 5 can cause the subpixels P1 to P6 to display the left eye image. The controller 5 can cause the subpixels P7 to P12 to display the right eye image. This allows the left eye 31*l* of the user 30 to view the virtual image of the left eye image on the left viewable areas VaL and allows the right eye 31*r* of the user 30 to view the virtual image of the right eye image on the right viewable areas VaR. As described above, the right eye image and the left eye image are parallax images having parallax between them. The user 30 can thus view the right eye image and the left eye image as a 3D image.

A change in the positions of the eyes 31 of the user 30 changes the parts of the subpixels P1 to P12 used to display the virtual image viewable with the left eye 31*l* and the right eye 31*r* of the user 30. The HUD system 100 may further include a detector 13 for detecting the positions of the left eye 31*l* and the right eye 31*r* of the user 30. The detector 13 outputs the detected positions of the left eye 31*l* and the right eye 31*r* of the user 30 to the controller 5. The detector 13 may include an imaging device or a sensor. For the HUD system 100 mounted on the movable body 20 being a vehicle, the detector 13 may be installed in any of various places such as on a rearview mirror, an instrument panel, a steering wheel, or a dashboard.

For the detector 13 including an imaging device, the imaging device captures a subject and generates an image of the subject. The imaging device includes an image sensor. The image sensor may include, for example, a charge-coupled device (CCD) image sensor or a complementary metal-oxide-semiconductor (CMOS) image sensor. The imaging device is arranged to have the face of the user 30 being at the position of the subject. For example, the detector 13 may define a predetermined position as the origin and detect the direction and amount of displacements of the eyes 31 from the origin. The detector 13 may detect, with two or more imaging devices, the position of at least one of the left eye 31*l* and the right eye 31*r* as the coordinates in a 3D space.

The detector 13 may include no imaging device and may be connected to an external imaging device. The detector 13 may include an input terminal for receiving signals from the external imaging device. The external imaging device may be directly connected to the input terminal. The external imaging device may be connected to the input terminal indirectly through a shared network.

For the detector 13 including a sensor, the sensor may be an ultrasonic sensor or an optical sensor.

The controller 5 may obtain positional information about the left eye 31*l* and the right eye 31*r* of the user 30 from the detector 13 through an obtainer 14. The obtainer 14 can obtain positional information about the left eye 31*l* and the right eye 31*r* of the user 30 detected by the detector 13. The detector 13 and the obtainer 14 are connected to each other through wired or wireless communication or both. For the movable body 20 being a vehicle, the detector 13 and the obtainer 14 may be connected to each other with a vehicle network such as a controller area network (CAN). The obtainer 14 may include a connector for wired communication, such as an electrical connector or an optical connector. The obtainer 14 may include an antenna for wireless communication.

The controller 5 controls, based on the position of the left eye 31*l* of the user 30, the parallax optical element 12 to allow the subpixels P1 to P6 displaying the left eye image to be viewed by the left eye 31*l*. The controller 5 controls, based on the position of the right eye 31*r* of the user 30, the parallax optical element 12 to allow the subpixels P7 to P12 displaying the right eye image to be viewed by the right eye 31*r*.

Figure 8:
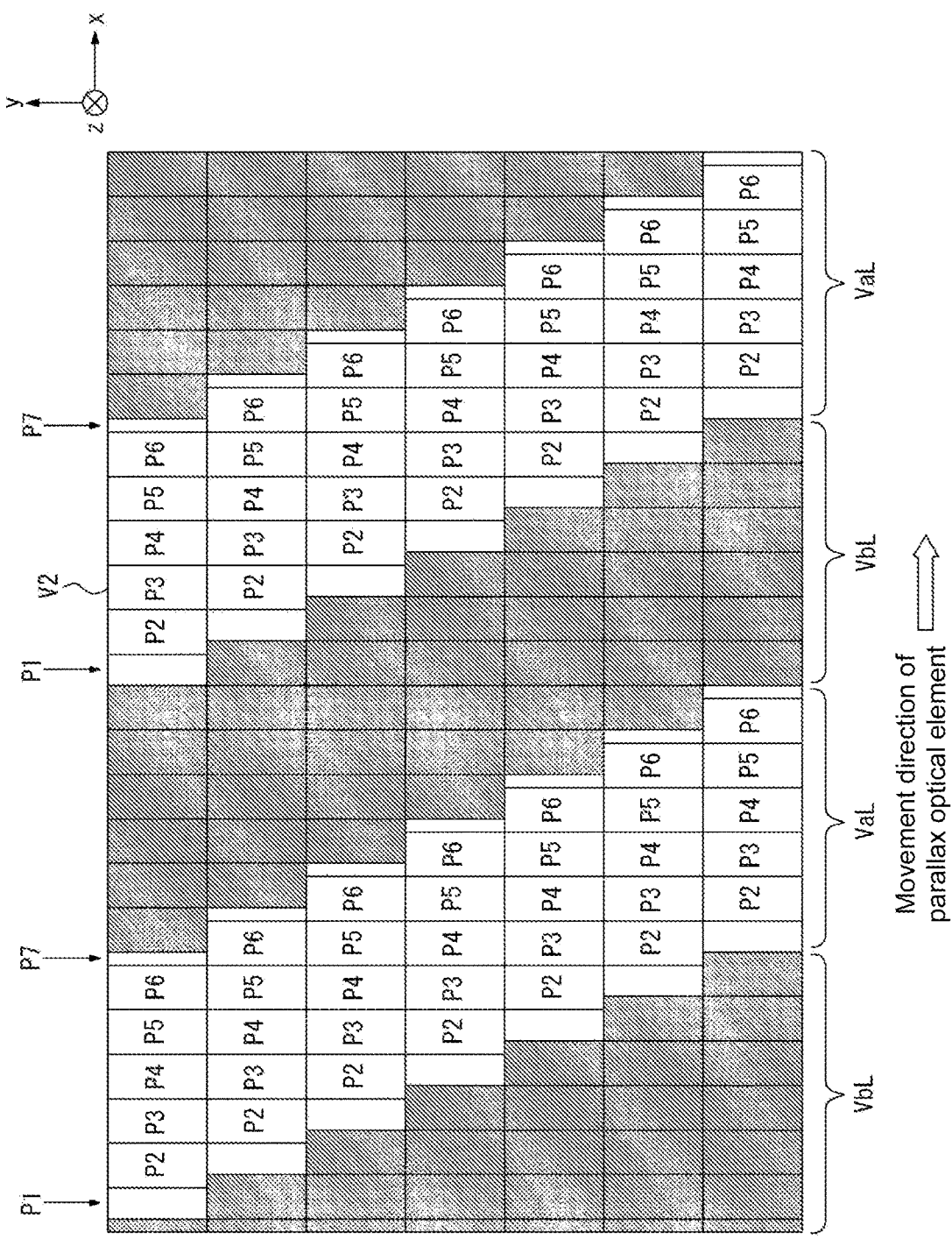
FIG. 8 is a diagram describing switching of the parallax optical element in response to a change in the positions of the user's eyes.

For example, the left eye 31*l* and the right eye 31*r* of the user 30 observing the second virtual image V2 as shown in FIGS. 6 and 7 may move relatively to the left. This causes the third virtual image V3 that is a virtual image of the parallax optical element 12 to appear to move to the right. FIG. 8 shows the second virtual image V2 when the left eye 31*l* of the user 30 has moved to the left from the state shown in FIG. 6. As the left eye 31*l* of the user 30 moves to the left, the left viewable areas VaL and the left light-reducing areas VbL move to the right.

In the example shown in FIG. 8, each left viewable area VaL includes the full area of each of the subpixels P2 to P6 and a part of each of the subpixels P1 and P7. Each right viewable area VaR includes the full area of each of the subpixels P8 to P12 and a part of each of the subpixels P7 and P1. The controller 5 controls the parallax optical element 12 to cause each left viewable area VaL to include a maximum area of each of the subpixels P1 to P6 displaying the left eye image. For example, in response to the left eye 31*l* of the user 30 moving further to the left from the state shown in FIG. 8, causing each left viewable area VaL to include a larger area of each subpixel P7 than the area of each subpixel P1, the controller 5 may switch open pixels P in the parallax optical element 12. In this case, the controller 5 switches, to open pixels, pixels with a lower light transmittance in the parallax optical element 12 for which virtual images are located adjacent to the left of the left viewable areas VaL. The controller 5 switches, to pixels with a lower light transmittance, open pixels in the parallax optical element 12 for which virtual images are located adjacent to the left of the left light-reducing areas VbL. The controller 5 switches open pixels P to maintain the subpixels P1 to P6 displaying the left eye image to be most easily viewable by the left eye 31*l* of the user 30. The controller 5 controls the parallax optical element 12 for the right eye 31*r* in the same manner.

In some embodiments, the parallax optical element 12 may have an aperture ratio of less than 50%. When, for example, one subpixel group Pg in the active area A includes 12 subpixels P1 to P12 as in FIG. 3, the controller 5 may control one subpixel group Pg to constantly include five subpixels with a higher light transmittance. In the state in FIG. 8, the controller 5 may control the parallax optical element 12 to place another pixel P with a lower light transmittance to the left of each left light-reducing area VbL to reduce image light from the subpixel P7.

In one of multiple embodiments, the second projection module 3 may be switchable, for the user 30, between a first state for displaying a 3D image and a second state for displaying a 2D image in the manner described above. In the first state, the controller 5 displays a parallax image on the second display panel 11 and displays, on the parallax optical element 12, the transmissive portions 12*a* and the light-reducing portions 12*b* for defining the traveling direction of image light. In the second state, the controller 5 displays a 2D image representing a 2D image on the second display panel 11 and causes the parallax optical element 12 to be entirely in a light transmission state to transmit image light uniformly. The controller 5 performs control to synchronize the switching of the states of the second display panel 11 and the parallax optical element 12. This allows the second projection module 3 to select either a 2D image or a 3D image as appropriate and display the image for the user 30.

The second projection module 3 may further include an input unit 15 that obtains external information. For the HUD system 100 mounted on the movable body 20, the input unit 15 can obtain information from an electronic control unit (ECU) 21 in the movable body 20. The ECU 21 is a computer that electronically controls various devices mounted on the movable body 20. The ECU 21 may include a navigation system or a system for controlling the inter-vehicle distance.

The second projection module 3 may further change at least either the position or the orientation of at least one component included in the optical system 9. The second projection module 3 may include a drive 17 for changing the position or the orientation of at least one component included in the optical system 9. The drive 17 may include, for example, a stepper motor. For example, the drive 17 can change the tilt of the mirror included in the optical system 9. The controller 5 may control the drive 17. The drive 17 drives the second projection module 3 to change the position at which the second image is projected on the first reflective optical element 4.

The HUD system 100 includes a glass cover 18 for protecting the first projection module 2 between the first display panel 6 in the first projection module 2 and the first reflective optical element 4. As shown in FIG. 2, the glass cover 18 is included in the HUD 1 including the first projection module 2, the first reflective optical element 4, and the controller 5. The glass cover 18 is a light-transmissive optical member. The glass cover 18 may be located between the optical system 9 in the second projection module 3 and the first reflective optical element 4. The glass cover 18 may be a flat glass plate or a curved glass plate. The first projection module 2 and the second projection module 3 may have their optical paths for image light from the first image and the second image at least partially overlapping the glass cover 18. The glass cover 18 with this structure can be small. The entire HUD system 100 with this structure can also be small. The glass cover 18 is an example light-transmissive member. The light-transmissive member may be another light-transmissive member, such as a resin member, other than the glass cover 18.

Figure 9:
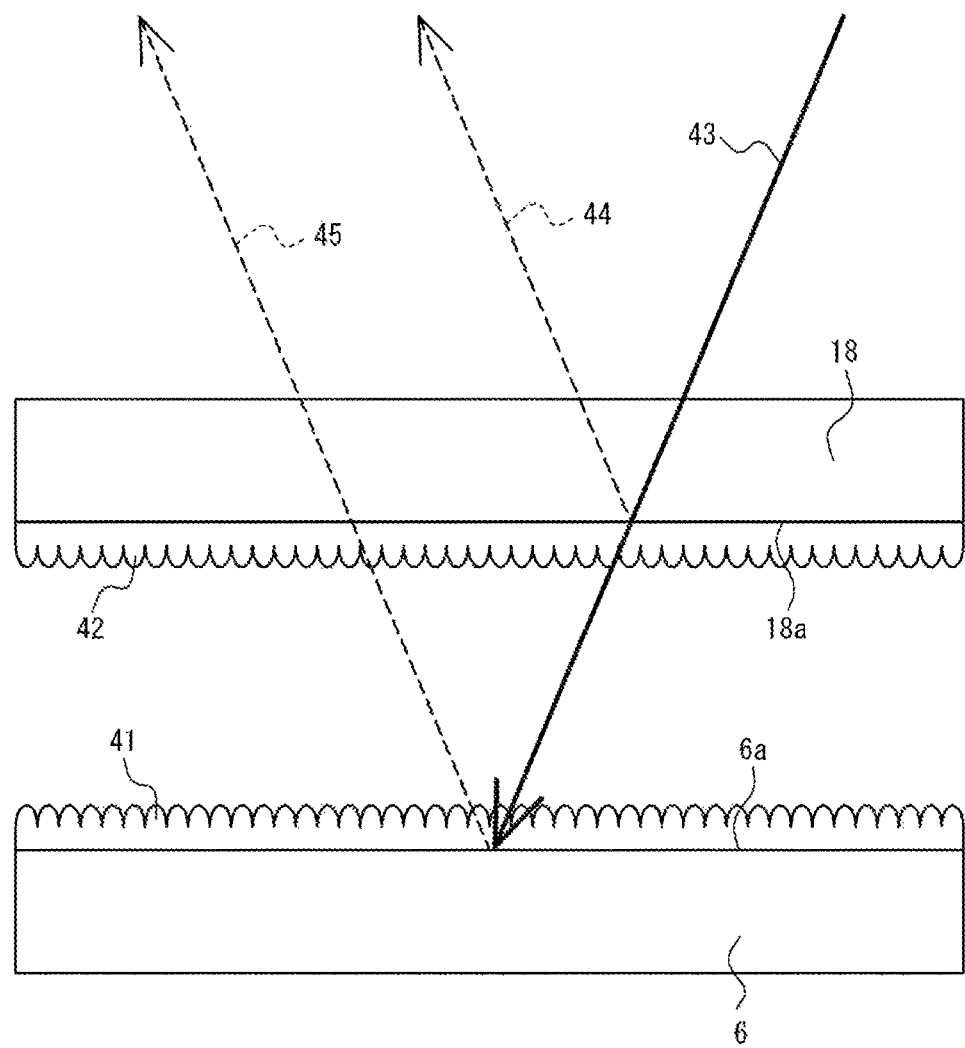
FIG. 9 is an enlarged view of a first display panel and an optical member in FIG. 1 showing their facing portions.

FIG. 9 is an enlarged view of a box 19 drawn with a broken line in FIG. 1. The first display panel 6 includes a first reflection reduction layer 41 on a first surface 6a to reduce light reflection. The glass cover 18 includes a second reflection reduction layer 42 on a second surface 18a to reduce light reflection. The first surface 6a and the second surface 18a face each other. The first reflection reduction layer 41 and the second reflection reduction layer 42 are located opposite to each other across an air layer. The first reflection reduction layer 41 reduces light reflection that can occur at an interface between the first display panel 6 and the air layer. The second reflection reduction layer 42 reduces light reflection that can occur at an interface between the glass cover 18 and the air layer. Each of the first reflection reduction layer 41 and the second reflection reduction layer 42 includes, for example, an anti-reflective film. Each of the first reflection reduction layer 41 and the second reflection reduction layer 42 may include, for example, a transparent film on which multiple transparent microscopic protrusions are arranged densely.

As shown in FIG. 9, external light 43 entering the glass cover 18 may be reflected off the second surface 18a of the glass cover 18 facing the first display panel 6 to be reflected light 44. The second reflection reduction layer 42 can reduce the amount of reflected light 44. The second reflection reduction layer 42 can reduce the amount of reflected light 44 to a severalth or to a few tenths of the amount of reflected light 44 that may result from the structure with no second reflection reduction layer 42. The external light 43 traveling through the glass cover 18 and reaching the first display panel 6 may be reflected off the first surface 6a facing the glass cover 18 to be reflected light 45. The first reflection reduction layer 41 can reduce the amount of reflected light 45. The first reflection reduction layer 41 can reduce the amount of reflected light 45 to a severalth or to a few tenths of the amount of reflected light 45 that may result from the structure with no first reflection reduction layer 41.

Figure 10:
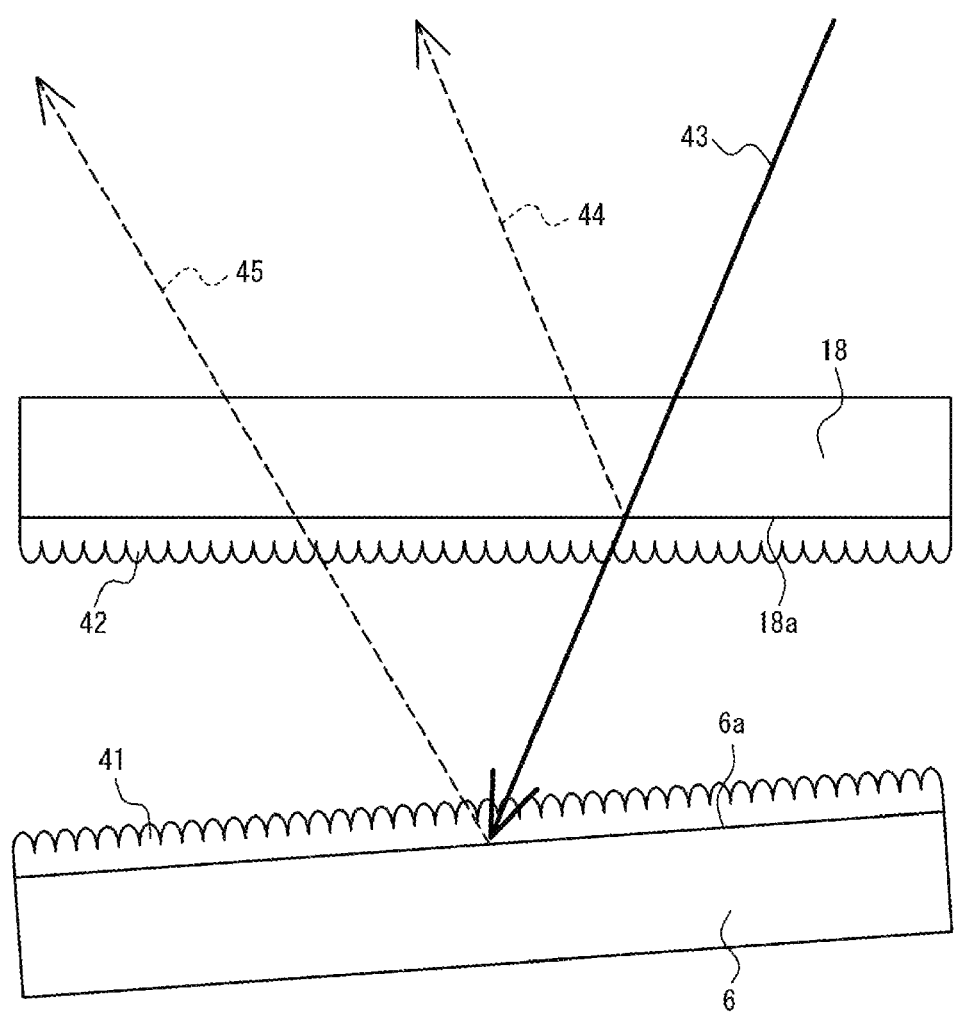
FIG. 10 is a view of the first display panel and the optical member in FIG. 9 with their facing surfaces not parallel to each other.

In FIG. 9, the first surface 6a of the first display panel 6 and the second surface 18a of the glass cover 18 are located substantially parallel to each other. In some embodiments, the first surface 6a and the second surface 18a may be located not to be parallel to each other as shown in FIG. 10. The first surface 6a and the second surface 18a may tilt with respect to each other to cause the reflected light 45 of the external light 43 off the first surface 6a and the reflected light 44 of the external light 43 off the second surface 18a to be in different directions. This causes such reflected light to be in disperse directions. The second surface 18a of the glass cover 18 may include a curved surface. This structure reduces the reflected light 44 of the external light 43 off the second surface 18a traveling in a specific direction alone.

First Reflective Optical Element

The first reflective optical element 4 reflects at least a part of the first image and the second image. The first reflective optical element 4 reflects, toward the viewing zone 32 of the user 30, image light from the first image emitted from the first projection module 2 and image light from the second image emitted from the second projection module 3. The HUD system 100 mounted on the movable body 20 being a vehicle may use a windshield of the vehicle as the first reflective optical element 4.

Figure 11:
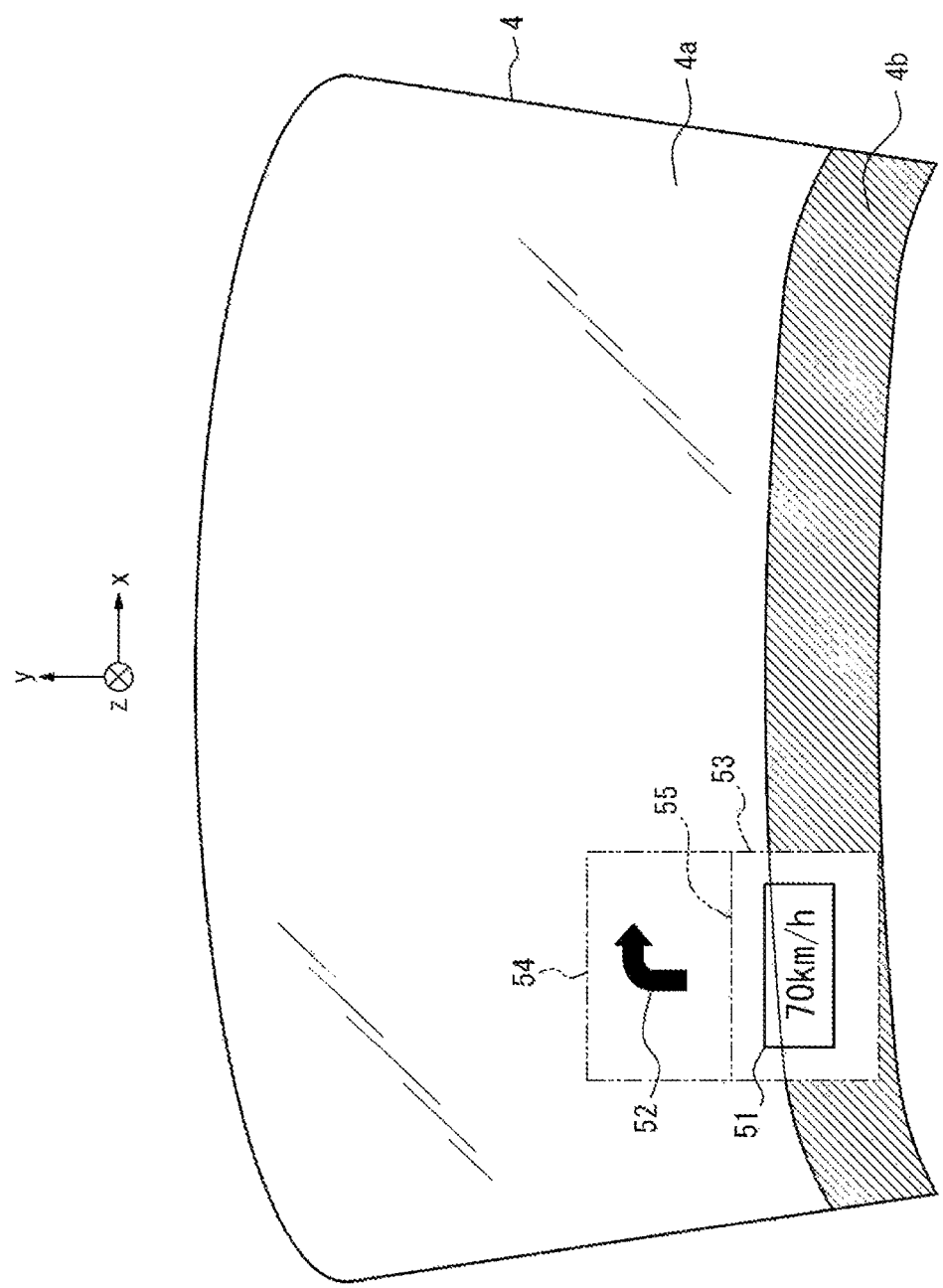
FIG. 11 is a diagram of an example display performed by the HUD system in FIG. 1.

With the first projection module 2 and the second projection module 3 in operation, the first reflective optical element 4 can cause a first image 51 and a second image 52 to appear in the field of view of the user 30 as shown in FIG. 11. The first image 51 appears on a first image display area 53. The first image display area 53 is an area on the first reflective optical element 4 onto which an image displayed on the first display panel 6 can be projected. The second image 52 appears in a second image display area 54. The second image display area 54 is an area on the first reflective optical element 4 onto which an image displayed on the second display panel 11 can be projected. The first image display area 53 and the second image display area 54 may be adjacent to each other with a boundary 55 between them. The first image display area 53 and the second image display area 54 may be partially superimposed on each other. The first image display area 53 and the second image display area 54 may be apart from each other.

As shown in FIG. 11, the first reflective optical element 4 may include a first reflective area 4a that reflects a part of incident light and transmits another part of the incident light. The first projection module 2 may project at least a part of the first image 51 onto the first reflective area 4a. The second projection module 3 may project the entire second image onto the first reflective area 4a. This allows the portion of the first image 51 in the first reflective area 4a and the second image to appear in the field of view of the user 30 in a manner superimposed on the background opposite to the user 30 from the first reflective optical element 4.

The first reflective optical element 4 may include a second reflective area 4b that reflects a part of incident light and substantially blocks another part of the incident light. This allows the first image 51 and the second image 52 projected onto the second reflective area 4b to appear clearly in the field of view of the user 30 without being superimposed on the background opposite to the user 30 from the first reflective optical element 4. For example, the first projection module 2 may project a part of the first image 51 onto the second reflective area 4b. This allows the first image 51 to show information independent of information about the background.

In the HUD system 100 mounted on the movable body 20 being a vehicle, the windshield may include a lower black portion as the second reflective area 4b. The lower black portion of the windshield may be referred to as a black ceramic portion. The second reflective area 4b in the movable body 20 may be usable for displaying information from measuring instruments such as a speedometer, a tachometer, or a direction indicator, which may be located on an instrument panel in a known movable body.

Controller

The controller 5 is connected to each of the components of the HUD system 100 to control these components. The controller 5 may be, for example, a processor. The controller 5 may include one or more processors. The processors may include a general-purpose processor that reads a specific program to perform a specific function, and a processor dedicated to specific processing. The dedicated processor may include an application-specific integrated circuit (ASIC). The processor may include a programmable logic device (PLD). The PLD may include a field-programmable gate array (FPGA). The controller 5 may be either a system on a chip (SoC) or a system in a package (SiP) in which one or more processors cooperate with other components.

The controller 5 includes a memory. The memory includes any storage device such as a random-access memory (RAM) or a read-only memory (ROM). The memory may store any programs and information for various processes. For example, the memory may store, as the first image 51 and the second image 52, display items to be displayed. Examples of display items include text, graphics, and animations combining text and graphics.

In the HUD system 100 shown in FIG. 1, the controller 5 is separate from the first projection module 2 and the second projection module 3. Instead of this structure, the functions of the controller 5 may be distributed in the first projection module 2 and the second projection module 3. The controller 5 for the first projection module 2 and the controller 5 for the second projection module 3 may cooperate with each other. In this case, the functions of the controller 5 may be included in the first projection module 2 and the second projection module 3. The HUD system 100 thus includes the first projection module 2, the second projection module 3, and the first reflective optical element 4.

Reducing Susceptibility to External Light

In the HUD system 100, external light such as sunlight incident on the glass cover 18 may be partially reflected and travel into the field of view of the user 30, possibly obstructing the view of an image and also affecting the driving of the movable body 20. The HUD system 100 according to one or more embodiments of the present disclosure includes the first reflection reduction layer 41 on the first surface 6a of the first display panel 6 and the second reflection reduction layer 42 on the second surface 18a of the glass cover 18 to reduce susceptibility to such external light.

In the example described below, the movable body 20 and the sun 61 are in the positional relationship in FIG. 12. External light 62 from the sun 61 travels through the first reflective optical element 4 and is incident on the glass cover 18. In the structure without the first reflection reduction layer 41 and the second reflection reduction layer 42, the external light 62 can be reflected off the second surface 18a of the glass cover 18 or the first surface 6a of the first display panel 6. Reflected light 63 reflected off the second surface 18a or the first surface 6a can reach at least either the left eye 31l or the right eye 31r of the user 30 after traveling on the path indicated by the broken line in the figure. In this case, the first image 51 in FIG. 11 can overlap the reflected light 63 and can be less easily viewable.

In contrast, the HUD system 100 according to one or more embodiments of the present disclosure includes the first reflection reduction layer 41 on the first surface 6a of the first display panel 6 and the second reflection reduction layer 42 on the second surface 18a of the glass cover 18 to reduce such reflected light 63. This structure allows the field of view of the user 30 to be less susceptible to reflection of the external light 62.

Figure 12:
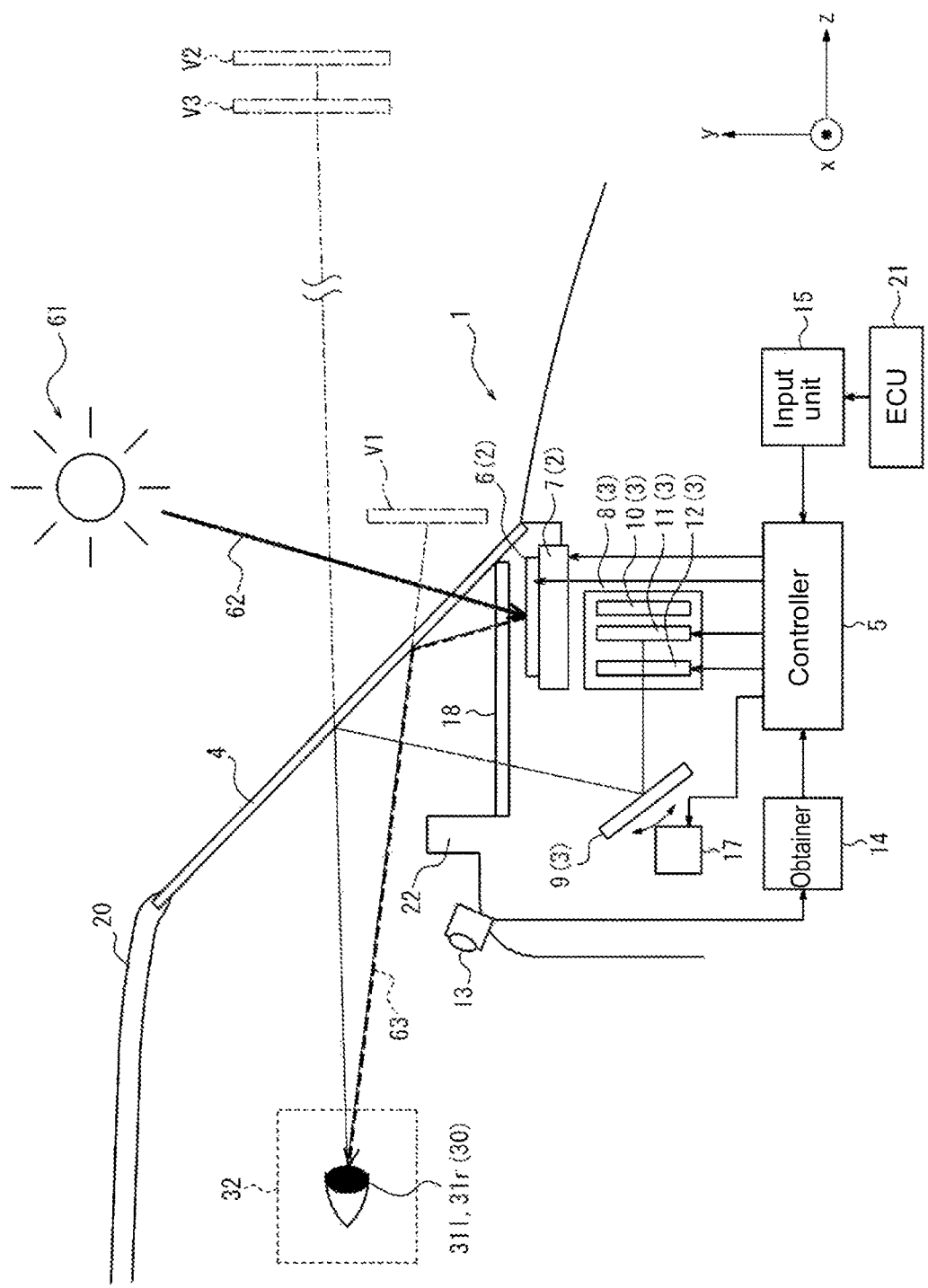
FIG. 12 is a diagram of a vehicle showing an example optical path for external light entering the vehicle.

The positional relationship between the movable body 20 and the sun 61 in FIG. 12 is an example. In the HUD system 100, the external light 62 incident in various directions is reflected off at least one of the first reflective optical element 4, the first display panel 6, or the glass cover 18 and does not travel into the field of view of the user 30. For example, the HUD system 100 includes the glass cover 18 that reflects incident light in an area that can possibly be incident on the glass cover 18 from outside the movable body 20. The external light thus does not reach the left eye 31l and the right eye 31r of the user 30 of the movable body 20. For example, the HUD system 100 includes the glass cover 18 that reflects incident light in an area that can possibly be incident on the glass cover 18 from outside the movable body 20, and includes the first reflective optical element 4 that further reflects the incident light. The external light thus does not reach the left eye 31l and the right eye 31r of the user 30 of the movable body 20. For example, the HUD system 100 includes the glass cover 18 that allows incident light in an area that can possibly be incident on the glass cover 18 from outside the movable body 20 to travel through the glass cover 18 and then to be reflected off the first display panel 6. The external light thus does not reach the left eye 31l and the right eye 31r of the user 30 of the movable body 20. This structure allows the field of view of the user 30 to be less susceptible to reflection of the external light 62.

The HUD system 100 may have the structure designed based on the shape and the position of the windshield as the first reflective optical element 4 of the movable body 20 on which the HUD system 100 is mounted and also the vehicle structure to prevent the external light 62 incident in substantially all directions from reaching the left eye 31l and the right eye 31r of the user 30. The glass cover 18 may be installed at a position not viewable by the user 30. The glass cover 18 may be installed to have the direction of the normal to the glass surface being tilted forward to, for example, prevent the external light 62 from being reflected and traveling into the vehicle interior of the movable body 20.

Figure 13:
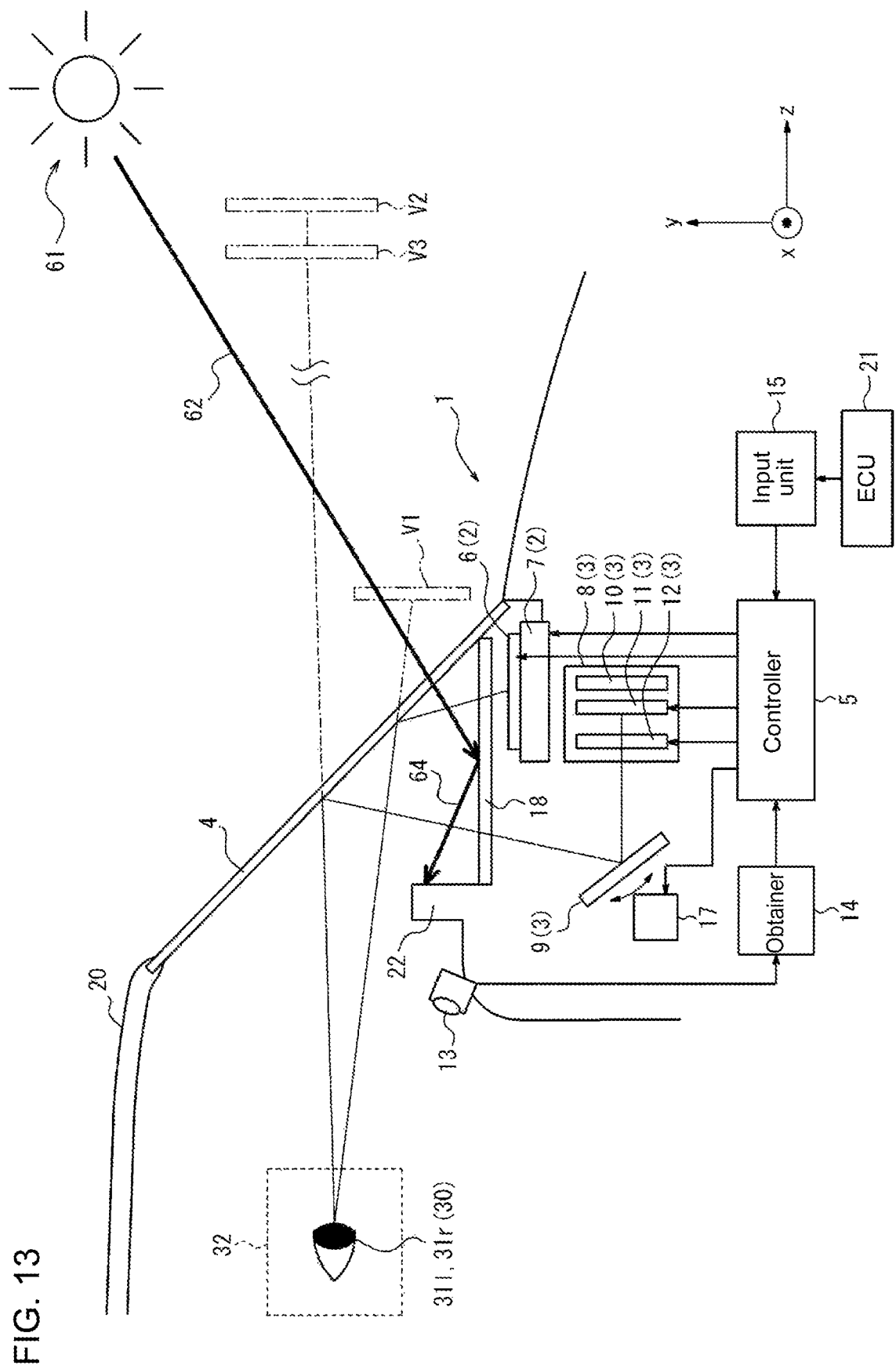
FIG. 13 is a diagram of a vehicle showing another example optical path for external light entering the vehicle.

The movable body 20 may include a light shield 22 between the eye position of the user 30 aboard the movable body 20 and the glass cover 18 to block at least a part of external light. The light shield 22 may be, for example, a protrusion on the dashboard of the movable body 20. As shown in FIG. 13, for example, the light shield 22 at least partially blocks reflected light 64 reflected by the glass cover 18 from the external light 62 from the sun 61 incident after traveling through the windshield as the first reflective optical element 4. The light shield 22 is located not to interfere with the optical path for image light from the first image and the second image traveling toward the left eye 31l and the right eye 31r of the user 30. This structure allows the user 30 to view the first image and the second image in the HUD system 100 without viewing the external light 62 from the sun 61.

Although the above embodiments are described as typical examples, various modifications and substitutions to the embodiments are apparent to those skilled in the art without departing from the spirit and scope of the present invention. Thus, the above embodiments should not be construed to be restrictive, but may be variously modified or altered within the scope of the present invention. For example, multiple structural blocks described in the above embodiments or examples may be combined into a structural block, or each structural block may be divided. The embodiments of the present disclosure can also be implemented as a method or a program implementable by a processor included in the device, or as a storage medium storing the program. These method, program, and storage medium also fall within the scope of the present disclosure.

In one or more embodiments of the present disclosure, the second projection module includes a liquid crystal shutter as a parallax optical element. The parallax optical element is not limited to a liquid crystal shutter but may be another optical element that can substantially define the viewing zone for the parallax image. For example, the parallax optical element may be a parallax barrier plate with slits that are arranged parallel to one another. The slits allow transmission of the right eye image in the parallax image along the optical path toward the right eye and the left eye image toward the left eye. For the parallax optical element being the parallax barrier with fixed openings as described above, the controller may switch, based on the movement of the head of the user, between subpixels displaying the left eye image and subpixels displaying the right eye image on the second display panel. In this manner, the controller can continue displaying a 3D image for the user independently of any displacements of the eyes of the user.

The parallax optical element may include multiple lenticular lenses arranged parallel to one another into a flat surface. The lenticular lenses can deflect the left eye image and the right eye image in the parallax image alternately displayed on the second display panel respectively to the optical path toward the right eye and the optical path toward the left eye.

The present disclosure may be implemented in the following forms.

A head-up display according to one or more embodiments of the present disclosure is a head-up display mountable on a movable body. The head-up display includes a first display panel, a reflective optical element, and an optical member. The first display panel displays a first image. The reflective optical element at least partially reflects image light from the first image displayed by the first display panel toward a user of the movable body. The optical member is between the display panel and the reflective optical element and is light transmissive. The display panel includes a surface facing a surface of the optical member. Each of the surface of the display panel and the surface of the optical member includes a reflection reduction layer that reduces light reflection.

A head-up display system according to according to one or more embodiments of the present disclosure is a head-up display system mountable on a movable body. The head-up display system includes a first display panel, a reflective optical element, an optical member, a second display panel, and an optical system. The first display panel displays a first image. The reflective optical element at least partially reflects image light from the first image displayed by the first display panel toward a user of the movable body. The optical member is between the display panel and the reflective optical element and is light transmissive. The second display panel displays a second image. The optical system allows image light from the second image displayed by the second display panel to travel toward the reflective optical element. The optical member is between the optical system and the reflective optical element. The display panel includes a surface facing a surface of the optical member. Each of the surface of the display panel and the surface of the optical member includes a reflection reduction layer that reduces light reflection.

A movable body according to one or more embodiments of the present disclosure includes a head-up display. The head-up display includes a first display panel, a reflective optical element, and an optical member. The first display panel displays a first image. The reflective optical element at least partially reflects image light from the first image displayed by the first display panel. The optical member is between the display panel and the reflective optical element and is light transmissive. The display panel includes a surface facing a surface of the optical member. Each of the surface of the display panel and the surface of the optical member includes a reflection reduction layer that reduces light reflection.

The structure according to one or more embodiments of the present disclosure is less susceptible to reflected external light that may affect the field of view of a user.

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

REFERENCE SIGNS LIST 1 head-up display (HUD)
2 first projection module
3 second projection module
4 first reflective optical element
4a first reflective area
4b second reflective area
5 controller
6 first display panel
6a first surface
7 stage
8 display device
9 optical system
10 illuminator
11 second display panel
12 parallax optical element
13 detector
14 obtainer
15 input unit
17 drive
18 glass cover (optical member)
18a second surface
19 box drawn with broken line
20 movable body
21 electronic control unit (ECU)
22 light shield
30 user
31L left eye
31R right eye
32 viewing zone
41 first reflection reduction layer (reflection reduction layer)
42 second reflection reduction layer (reflection reduction layer)
43 external light
44 reflected light
45 reflected light
51 first image
52 second image
53 first image display area
54 second image display area
55 boundary
56 display item
61 sun
62 external light
63 reflected light
64 reflected light
100 head-up display system (HUD system)
A active area
P pixel
Pg subpixel group
V1 first virtual image
V2 second virtual image
V3 third virtual image
VaL left viewable area
VbL left light-reducing area
VaR right viewable area
VbR right light-reducing area

The invention claimed is:

1. A head-up display mountable on a movable body, the head-up display comprising:
a first display panel configured to display a first image;
a reflective optical element configured to at least partially reflect image light from the first image displayed by the first display panel toward a user of the movable body; and an optical member between the first display panel and the reflective optical element, the optical member being light transmissive, wherein the first display panel includes a surface facing a surface of the optical member, and each of the surface of the first display panel and the surface of the optical member includes a reflection reduction layer configured to reduce light reflection.

2. The head-up display according to claim 1, wherein the reflection reduction layer includes an anti-reflective film.

3. The head-up display according to claim 1, wherein the surface of the first display panel and the surface of the optical member facing each other are not parallel to each other.

4. The head-up display according to claim 1, wherein the optical member includes a curved surface opposite to the surface of the optical member facing the surface of the first display panel.

5. The head-up display according to claim 1, wherein the optical member includes a glass cover protecting the first display panel.

6. The head-up display according to claim 1, wherein the head-up display reduces, for incident light in a range in which the light is incident on the optical element from outside the movable body, reflection off the optical element and causes the incident light not to reach an eye of the user of the movable body.

7. The head-up display according to claim 1, wherein the head-up display reduces, for incident light in a range in which the light is incident on the optical element from outside the movable body, reflection off the optical element and reflection off the reflective optical element and causes the incident light not to reach an eye of the user of the movable body.

8. The head-up display according to claim 1, wherein the head-up display allows incident light in a range in which the light is incident on the optical element from outside the movable body to travel through the optical element and reduces reflection of the incident light off the first display panel and causes the incident light not to reach an eye of the user of the movable body.

9. A head-up display system mountable on a movable body, the head-up display system comprising:
a first display panel configured to display a first image;
a reflective optical element configured to at least partially reflect image light from the first image displayed by the first display panel toward a user of the movable body;
an optical member between the first display panel and the reflective optical element, the optical member being light transmissive;
a second display panel configured to display a second image; and
an optical system configured to allow image light from the second image displayed by the second display panel to travel toward the reflective optical element,
wherein the optical member is between the optical system and the reflective optical element, the first display panel includes a surface facing a surface of the optical member, and each of the surface of the first display panel and the surface of the optical member includes a reflection reduction layer configured to reduce light reflection.

10. The head-up display system according to claim 9, further comprising:
a parallax optical element;
a controller; and
a detector,
wherein the second display panel displays a parallax image as the second image, the parallax optical element substantially defines a traveling direction of the parallax image to substantially define a viewing zone for the parallax image, the detector detects a position of an eye of the user as positional information, and the controller controls the parallax optical element based on the positional information.

11. A movable body, comprising:
a head-up display including
a first display panel configured to display a first image,
a reflective optical element configured to at least partially reflect image light from the first image displayed by the first display panel, and
an optical member between the first display panel and the reflective optical element, the optical member being light transmissive,
wherein the first display panel includes a surface facing a surface of the optical member, and each of the surface of the first display panel and the surface of the optical member includes a reflection reduction layer configured to reduce light reflection.

12. The movable body according to claim 11, further comprising:
a light shield between an eye of a user aboard the movable body and the optical member, the light shield being configured to block at least a part of external light.

* * * * *